Aug. 23, 1949.  A. J. FULBRIGHT, SR  2,479,611
ANIMAL TRAP MINNOW BAIT
Filed March 25, 1947

Inventor
ALSON J FULBRIGHT, SR.

By McMorrow, Berman & Davidson
Attorneys

Patented Aug. 23, 1949

2,479,611

UNITED STATES PATENT OFFICE 2,479,611

ANIMAL TRAP MINNOW BAIT

Alson J. Fulbright, Sr., Little Rock, Ark.

Application March 25, 1947, Serial No. 736,932

1 Claim. (Cl. 43—2)

This invention relates to spinning minnows actuated by water passing thereover and used in combination with animal traps positioned in the water, and in particular includes a plate forming a base with a twisted element forming a minnow or the like rotatably mounted in upwardly extending bearing elements at the ends of the base.

The purpose of this invention is to provide means for attracting fish-eating animals, such as racoons, to traps positioned in shallow water or below small falls.

Many animals, particularly of the cat family and racoons, are fond of fish and feed in small streams, waterfalls, and the like, and with this thought in mind, this invention contemplates a spinner resembling a small fish, such as a minnow, with a mounting element therefor by which the spinner may be mounted on or attached to an animal trap.

An object of this invention is to provide means for mounting a spinner in a freely rotatable position by which the spinner may readily be attached to a trap for animals and the like.

Another object of the invention is to provide a spinner mounting wherein the spinner is freely rotatable in upwardly extending elements and the longitudinal movement thereof is limited by projections on the upwardly extending elements contacting opposite ends of a shaft or shafts upon which the minnow is mounted.

Spinners used as bait in combination with animal traps are subjected to considerable abuse and may be destroyed by the animal, and for this reason an essential object of the invention is to provide a spinner of comparatively simple and economical construction, wherein the spinner may be discarded after use.

With these and other objects in view, the invention embodies a relatively flat base plate with upwardly extending ends having apertures therein and a spinner formed of a twisted plate with small stub shafts extending at the ends and adapted to be rotatably mounted in the apertures of the upwardly extending ends of the base.

Other features and advantages of the invention will appear from the following description, taken in connection with the drawings, wherein.

Figure 1:
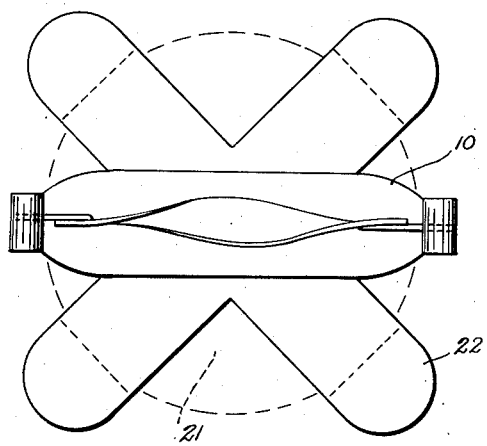
Figure 1 is a plan view illustrating the spinner mounted on an animal trap.

Referring now to the drawings, wherein like reference characters indicate corresponding parts, the spinner of this invention includes a base 10 having upwardly extending ends 11 and 12 and a spinner 13.

Figure 3:
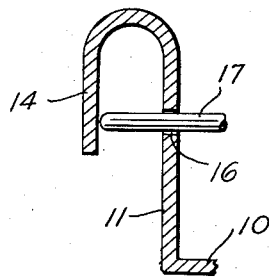
Figure 3 is a detail sectional view through one end of the spinner base illustrating the shaft mounting in the upwardly extending ends of the base.

The base is formed of a relatively narrow strip of comparatively thin material with the ends 11 and 12 bent substantially at right angles thereto and extending upward, and wherein the upper ends of the ends 11 and 12 bend over and downward providing projections 14 and 15, as illustrated in detail in Figure 3. The ends 11 and 12 are provided with aligned apertures 16 in which the ends of comparatively small stub shafts 17 and 18, rigidly attached to the opposite ends of the spinner, are rotatably held. The shafts 17 and 18 are preferably formed with rounded outer ends, and the projections 14 and 15 are positioned to be contacted by the ends, as illustrated in Figure 3, wherein the current flow of water or the like around the spinner drives the ends of the shafts against the projections, thereby spacing the ends of the minnow element 13 from the inner surfaces of the ends 11 and 12, so that frictional contact of the ends of the minnow element with the ends of the bait is prevented.

The spinner 13 may be formed to represent a minnow or small fish of any type and may be made of any suitable design or material. In the design shown, it is formed of a comparatively thin, flat strip or plate with a rounded forward end 19 and projections indicating a tail 20 at the opposite end, and the strip is twisted, as illustrated, wherein the flow of current lengthwise thereof will cause the device to spin through the stub shafts 17 and 18 in the apertures 16. The spinner may be of any suitable color, although it is preferred to provide a bright shiny coating on one side with the other side dull or black.

Figure 2:
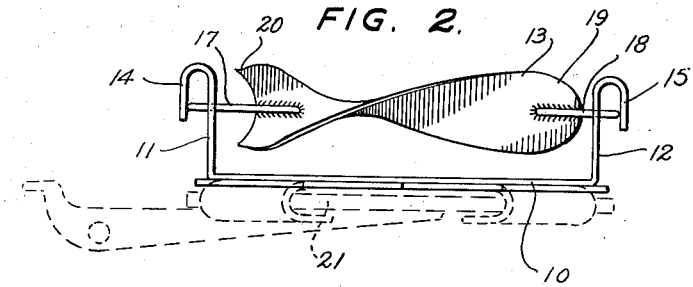
Figure 2 is a view showing a side elevation of the spinner and mounting base therefor.

The base plate 10 may be mounted on a trigger pan 21 carried by the conventional lever of a trap, as illustrated in Figure 1; the base plate being provided with a plurality of radially extending fingers 22 which are adapted to be bent around parts of the trigger pan, as illustrated by the dotted lines in Figure 2.

The animal trap spinning minnow of this invention, therefore, includes a twisted plate resembling a small fish pivotally mounted in a base element, wherein the base element may be mounted upon an animal trap, wherein with the trap positioned in water having a current, the current will actuate the spinner providing a lure for animals feeding in the water. The trap with the spinner thereon may be placed in a lake, small stream, or may be positioned at the base of a cliff with a small stream of water falling thereon. With the device formed of this comparatively simple construction, it may be discarded after use and a new device substituted.

It will be understood that modifications may be made in the design or arrangement of the parts without departing from the spirit of the invention.

What is claimed is:

A lure for attachment to an animal trap comprising a strip of relatively thin material forming a flat base, said base having upwardly extending ends, said ends each having an inverted U-shaped top portion providing inner and outer legs, said U-shaped top portions having aligned apertures in the inner legs thereof, a plurality of radially extending gripping fingers attached to the under surface of said base, and a relatively thin narrow strip of material in the form of a spinner, said spinner having a stub shaft coaxially positioned at each end thereof and secured thereto, said stub shafts being rotatably mounted in the apertures of the inner legs of said U-shaped top portions, and having the ends of said stub shafts in contact with the outer legs of said inverted U-shaped top portions, the ends of said spinner being in spaced relation from the inner legs of said U-shaped top portions.

ALSON J. FULBRIGHT, Sr.

REFERENCES CITED

The following references are of record in the file of this patent:

UNITED STATES PATENTS

| Number | Name | Date |
| --- | --- | --- |
| 405,868 | Bernardin | June 25, 1889 |
| 742,032 | Johnson | Oct. 20, 1903 |
| 1,319,832 | Berg | Oct. 28, 1919 |
| 1,529,568 | Ananian | Mar. 10, 1925 |
| 2,306,692 | Flood | Dec. 29, 1942 |

FOREIGN PATENTS

| Number | Country | Date |
| --- | --- | --- |
| 848,198 | France | July 17, 1939 |
| 500,399 | Great Britain | Feb. 8, 1939 |